(12) United States Patent
Cameron, Jr.

(10) Patent No.: US 9,548,684 B1
(45) Date of Patent: Jan. 17, 2017

(54) CURRENT CONTROL IN BRUSHLESS DC MOTORS

(71) Applicant: The Boeing Company, Chicago, IL (US)

(72) Inventor: Douglas Conrad Cameron, Jr., Ladera Ranch, CA (US)

(73) Assignee: THE BOEING COMPANY, Chicago, IL (US)

( * ) Notice: Subject to any disclaimer, the term of this patent is extended or adjusted under 35 U.S.C. 154(b) by 0 days.

(21) Appl. No.: 14/506,619

(22) Filed: Oct. 4, 2014

Related U.S. Application Data (63) Continuation of application No. 13/303,673, filed on Nov. 23, 2011, now Pat. No. 8,884,562.

(51) Int. Cl.
*H02P 6/00* (2016.01)
*H02P 6/14* (2016.01)

(52) U.S. Cl.
CPC ............... *H02P 6/001* (2013.01); *H02P 6/002* (2013.01); *H02P 6/14* (2013.01)

(58) Field of Classification Search
CPC ......... H02P 6/085; H02P 7/0044; H02P 6/008; H02P 7/28
USPC ........................... 318/400.26, 400.29, 400.01
See application file for complete search history.

(56) References Cited

U.S. PATENT DOCUMENTS

| | | | |
|---|---|---|---|
| 4,368,411 A | 1/1983 | Kidd | |
| 4,528,486 A | 7/1985 | Flaig et al. | |
| 4,937,725 A | 6/1990 | Dhyanchand et al. | |
| 5,189,601 A * | 2/1993 | Sellers | H02M 3/3376 363/132 |
| 5,254,935 A | 10/1993 | Vercesi et al. | |
| 6,344,985 B1 * | 2/2002 | Akerson | H02M 3/1582 363/65 |

(Continued)

FOREIGN PATENT DOCUMENTS

| | | |
|---|---|---|
| EP | 0596472 A2 | 5/1994 |
| EP | 2629166 A1 | 8/2013 |

(Continued)

OTHER PUBLICATIONS

Partial International Search Report, dated Oct. 9, 2014, regarding Application No. PCT/US2014/045045, 7 pages.

(Continued)

*Primary Examiner* — Kawing Chan
*Assistant Examiner* — Zoheb Imtiaz
(74) *Attorney, Agent, or Firm* — Yee & Associates, P.C.

(57) ABSTRACT

A method and apparatus for controlling a brushless direct current motor. An H-bridge is configured to couple a direct current power source to windings of the brushless direct current motor. The H-bridge comprises a plurality of switches. A motor controller is configured to close one of the plurality of switches to put the H-bridge in a coast configuration, wherein the windings of the motor are short circuited. A desired direction for a current impulse to the windings is identified. The one of the plurality of switches is opened in response to identifying a first desired direction for the current impulse to provide the current impulse in the first desired direction to the windings. Another of the plurality of switches is closed in response to identifying a second desired direction for the current impulse to provide the current impulse in the second desired direction to the windings.

20 Claims, 10 Drawing Sheets

(56) References Cited

U.S. PATENT DOCUMENTS

| | | | |
|---|---|---|---|
| 6,690,974 B2 * | 2/2004 | Archer | A61N 1/36064 607/45 |
| 6,742,741 B1 | 6/2004 | Rivoli | |
| 7,102,320 B1 * | 9/2006 | Haman | H02P 7/04 318/400.26 |
| 7,245,108 B2 | 7/2007 | Chertok et al. | |
| 7,653,464 B1 | 1/2010 | Mitra | |
| 8,511,606 B1 | 8/2013 | Lutke et al. | |
| 8,884,562 B1 | 11/2014 | Cameron | |
| 9,045,234 B2 | 6/2015 | Frolov et al. | |
| 2002/0146617 A1 | 10/2002 | Johnson et al. | |
| 2004/0263099 A1 | 12/2004 | Maslov et al. | |
| 2005/0007043 A1 | 1/2005 | Kim | |
| 2005/0052080 A1 | 3/2005 | Maslov et al. | |
| 2005/0179463 A1 | 8/2005 | Kasuya et al. | |
| 2006/0125436 A1 * | 6/2006 | Lin | F16C 32/0457 318/376 |
| 2006/0197490 A1 * | 9/2006 | Haman | H02P 7/04 318/800 |
| 2007/0285195 A1 * | 12/2007 | Nehl | G01R 33/14 335/209 |
| 2008/0275644 A1 | 11/2008 | Macneille et al. | |
| 2010/0064689 A1 | 3/2010 | Reinhardt | |
| 2011/0025124 A1 | 2/2011 | Brabec | |
| 2012/0098473 A1 * | 4/2012 | Nachev | H02P 6/24 318/400.12 |
| 2012/0298790 A1 | 11/2012 | Bitar | |
| 2013/0134264 A1 | 5/2013 | Carter et al. | |
| 2013/0294112 A9 * | 11/2013 | Jacques | H02M 3/337 363/19 |
| 2014/0129056 A1 | 5/2014 | Criado | |
| 2014/0239712 A1 | 8/2014 | Yoon et al. | |
| 2014/0306663 A1 | 10/2014 | Ngo et al. | |
| 2014/0354199 A1 | 12/2014 | Zeng et al. | |
| 2015/0028594 A1 | 1/2015 | Mariotto | |
| 2015/0097071 A1 | 4/2015 | Frolov et al. | |
| 2015/0136897 A1 | 5/2015 | Seibel et al. | |

FOREIGN PATENT DOCUMENTS

| | | |
|---|---|---|
| WO | WO2011149544 A1 | 12/2011 |
| WO | WO2014165502 A1 | 10/2014 |

OTHER PUBLICATIONS

Jojo, "SCR Applications," Electronic Circuits and Diagram-Electronics Projects and Design. Sep. 15, 2009, 6 pages. http://www.circuitstoday.com/scr-applications.

International Search Report and Written Opinion, dated Jan. 14, 2015, regarding Application No. PCT/US2014/045048, 20 pages.

Extended European Search Report, dated Mar. 20, 2015, regarding Application No. 14190508.3, 8 pages.

"SPEED Software," CD-Adapco, 4 pp., accessed Nov. 15, 2011, http://www.speedlab.co.uk/software.html.

"TG100H BLDC Inductor Board," ThinGap Corporation, 1 page, accessed Nov. 15, 2011, http://www.thingap.com/pdf/2011/tg100hbldcindboard.pdf.

Zeng et al., "Active Voltage Controller for an Electric Motor," U.S. Appl. No. 13/905,392, filed May 30, 2013, 47 pages.

Cameron, "Quadrant Change Control in Brushless DC Motors," U.S. Appl. No. 13/933,083, filed Jul. 2, 2013, 82 pages.

International Search Report and Written Opinion, dated Jul. 22, 2014, regarding Application No. PCT/US2014/033532, 15 pages.

Canadian Intellectual Property Office Examination Search Report, dated Nov. 26, 2015, regarding Application No. 2,865,632, 4 pages.

Office Action, dated Feb. 4, 2016, regarding U.S. Appl. No. 14/064,366, 38 pages.

Thomas et al., "Energy scavenging for small-scale unmanned systems," Esleveir Journal of Power Sources 159, 2006, pp. 1494-1509.

Qidwai el al., "Energy harvesting concepts for small electric unmanned systems," Smart Structures and Materials 2004: Active Materials: Behavior and Mechanics vol. 5387, 2004, pp. 84-95.

* cited by examiner

CURRENT CONTROL IN BRUSHLESS DC MOTORS

CROSS REFERENCE TO RELATED APPLICATIONS

This application is a continuation of application Ser. No. 13/303,673, filed Nov. 23, 2011, status allowed, and which is incorporated by reference herein in its entirety.

GOVERNMENT LICENSE RIGHTS

The invention was made with United States Government support under Contract Number FA8002-07-G-0511 awarded by the Department of Defense. The United States Government has certain rights in this application.

BACKGROUND INFORMATION

1. Field

The present disclosure relates generally to electric motors, such as brushless direct current (DC) motors, and to the control of such electric motors. More particularly, the present disclosure relates to controlling the current in the windings of a brushless DC motor using impulse width modulation.

2. Background

Aircraft may employ various electronic devices and systems to perform various functions on the aircraft. For example, without limitation, electric motors on an aircraft may be used to move flight control surfaces, to raise and lower landing gear, and to perform other functions on the aircraft. Power for the electric motors and other electronic systems and devices on an aircraft may be provided by an aircraft power system.

An example of a type of electric motor used on aircraft, and for many other applications, is a brushless DC electric motor. These types of motors are also known as electronically commutated motors. Brushless DC motors are powered by direct current (DC) electricity and have electronic commutators.

A brushless DC motor has permanent magnets which rotate and a fixed armature which comprises the stator windings. An electronic controller continually switches the phase of power provided to the windings to keep the motor turning. The controller may employ a solid stat circuit to provide timed power distribution to the motor windings.

Because the controller must direct the rotor rotation, the controller requires some means of determining the rotor's orientation relative to the stator windings. Some brushless DC motors use Hall effect sensors or a rotary encoder to directly measure the rotor's position. Others measure the back electromotive force (EMF) in the undriven windings to infer the rotor position. Controllers of this latter type are often called sensorless controllers. Other sensorless controllers are capable of measuring winding saturation caused by the position of the magnets to infer the rotor position.

The controller for a brushless DC motor may provide three bi-directional outputs to control the driving of DC power to the motor windings. The outputs may be controlled by a logic circuit. Simple controllers may employ comparators to determine when the output phase should be advanced. More advanced controllers may employ a microcontroller to manage acceleration, control speed, and fine tune-motor efficiency. Motor controllers of this type may be referred to as electronic speed controllers.

The controller may control the power that is provided to the windings of a DC motor by controlling the switches in an H-bridge. The H-bridge couples the DC power source to the windings of the DC motor. For example, a three-phase H-bridge has six switches for coupling the DC power source to three motor windings of a DC motor. The switches of the H-bridge may be controlled by the controller to drive a current in either direction on each of the motor windings. For example, without limitation, the H-bridge may be implemented using solid state switching devices such as metal-oxide-semiconductor field-effect transistors (MOSFETs).

Various methods may be used to control the switches in an H-bridge to modulate the current in the windings of a brushless DC motor. However, existing methods for modulating the current in the motor windings of a brushless DC motor have drawbacks. A method for controlling the current in the windings of a brushless DC motor that overcomes these drawbacks is desirable.

Accordingly, it would be desirable to have a method and apparatus that takes into account one or more of the issues discussed above as well as possibly other issues.

SUMMARY

An embodiment of the present disclosure provides an apparatus comprising an H-bridge and a motor controller. The H-bridge is configured to couple a direct current power source to windings of a motor and comprises a plurality of switches. The motor controller is configured to close one of the plurality of switches to put the H-bridge in a coast configuration, wherein the windings are short circuited. The motor controller is further configured to identify a desired direction for a current impulse to the windings. The motor controller is further configured to open the one of the plurality of switches in response to identifying a first desired direction for the current impulse to provide the current impulse in the first desired direction to the windings. The motor controller is further configured to close another of the plurality of switches in response to identifying a second desired direction for the current impulse to provide the current impulse in the second desired direction to the windings.

An embodiment of the present disclosure also provides a method for controlling a brushless direct current motor. One of a plurality of switches in an H-bridge is closed to put the H-bridge in a coast configuration, wherein windings of the brushless direct current motor are short circuited. The H-bridge is configured to couple a direct current power source to the windings. A desired direction for a current impulse to the windings is identified. The one of the plurality of switches is opened in response to identifying a first desired direction for the current impulse to provide the current impulse in the first desired direction to the windings. Another of the plurality of switches is closed in response to identifying a second desired direction for the current impulse to provide the current impulse in the second desired direction to the windings.

Another embodiment of the present disclosure provides a computer program product for controlling a brushless direct current motor. The computer program product comprises a computer readable storage medium. First program instructions, second program instructions, third program instructions, and fourth program instructions are stored on the computer readable storage medium. The first program instructions are for closing one of a plurality of switches in an H-bridge to put the H-bridge in a coast configuration, wherein windings of the brushless direct current motor are short circuited. The H-bridge is configured to couple a direct current power source to the windings. The second program instructions are for identifying a desired direction for a current impulse to the windings. The third program instructions are for opening the one of the plurality of switches in response to identifying a first desired direction for the current impulse to provide the current impulse in the first desired direction to the windings. The fourth program instructions are for closing another of the plurality of switches in response to identifying a second desired direction for the current impulse to provide the current impulse in the second desired direction to the windings.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives, and features thereof will best be understood by reference to the following detailed description of an illustrative embodiment of the present disclosure when read in conjunction with the accompanying drawings, wherein:

DETAILED DESCRIPTION

The different illustrative embodiments recognize and take into account a number of different considerations. "A number", as used herein with reference to items, means one or more items. For example, "a number of different considerations" means one or more different considerations.

The different illustrative embodiments recognize and take into account that there are several existing methods to control current via switching modulation in motor windings. However, all of these existing methods may have drawbacks.

The different illustrative embodiments recognize and take into account that pulse width modulation (PWM) is often used to control the current in motor windings. However, motor current controlled using pulse width modulation suffers ripple currents during all operations, even quiescent operations. With pulse width modulation, a zero current command results in a ripple current. Depending upon the inductance, power supply, and duty cycle frequency, the ripple currents may become large and cause unnecessary switch heating of the H-bridge, eddy current heating of the motor, and continuously audible motor buzzing. The use of pulse width modulation methods for motor control also imposes a constraint on the minimal inductance allowable on the motor design. This restraint is in conflict with the desirability of reducing inductance to increase the high rotational rate of the rotor.

The different illustrative embodiments also recognize and take into account that other methods utilize a short-circuiting of the motor windings to eliminate ripple currents and resulting heating in the motor. However, such methods are only two quadrant controllers. Two quadrant control means that the controller can only affect a positive change in the current forcing function when the windings have a positive current. The second quadrant is affecting a negative change in the current forcing function when the windings have a negative current. Two quadrant control of motor current may cause problems when attempting to control the current in situations where the current demand is at one current level but the back electromagnetic force is causing the current to be at a higher current level in the same direction. In this example, a two quadrant controller does not provide a forcing function to drive the current in the negative direction.

The different illustrative embodiments also recognize and take into account that hysteric choppers provide another method of controlling the current in motor windings. However, these methods are highly nonlinear and can change in frequency, causing unpredictable thermal conditions.

Illustrative embodiments provide control of the current in the windings of a DC motor using impulse width modulation. Impulse width modulation (IWM) of brushless DC motors is a digital algorithmic method that provides four quadrant control of current within the motor windings with an H-bridge switching configuration. During each duty cycle, closed-loop action determines the appropriate time for one H-bridge switch to be on or off in order to provide a desired positive or negative pulse of current. In accordance with an illustrative embodiment, current is pulsed in only the desired direction for each duty cycle. The windings are then short circuited by opening or closing another switch. Therefore, only one switch is turned on and off per duty cycle. This provides a desirable switching method over conventional pulse width modulation motor control, which cycles between positive and negative current forcing functions during each duty cycle by turning on and off four switches. Impulse width modulation, in accordance with an illustrative embodiment, provides the appropriate switch selections during generative and regenerative conditions to provide precise control of current without the ripple current associated with pulse width modulation.

Figure 1:
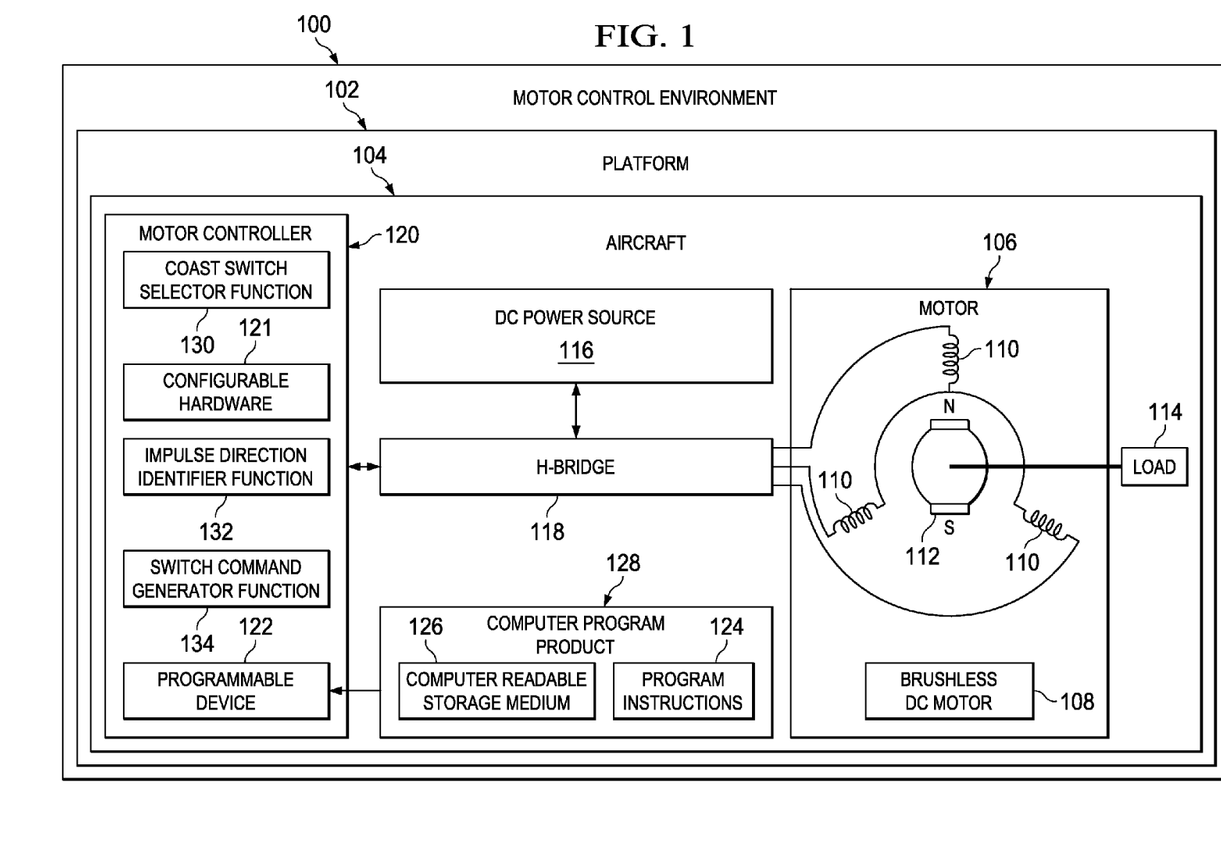
FIG. 1 is an illustration of a block diagram of a motor control environment in accordance with an illustrative embodiment.

Turning to FIG. 1, an illustration of a block diagram of a motor control environment is depicted in accordance with an illustrative embodiment. Motor control environment 100 may be implemented for controlling a motor for operation on platform 102. For example, without limitation, platform 102 may be aircraft 104 or another vehicle. As another example, platform 102 may be a submarine, an automobile, a satellite, or any other vehicle capable of traveling in the air, in space, on land, on the surface of water or underwater. As a further example, platform 102 may be a structure other than a vehicle on which a motor is operated.

Motor 106 is an electric motor. Specifically, motor 106 may be brushless DC motor 108. Motor 106 comprises windings 110 that are stationary and rotor 112. Windings 110 form the motor stator. Windings 110 also may be referred to as coils. Windings 110 are provided with power to drive rotation of rotor 112. Thus, windings 110 form the armature for motor 106.

Rotor 112 may be coupled to load 114. Load 114 may be any structure that may be moved in any manner via a direct or indirect connection to motor 106. For example, on aircraft 104, load 114 may include actuators for flight control services, for landing gear, or for performing other functions on aircraft 104. In other applications, load 114 may be a pump, a vehicle drive train, an actuator for performing another function, and/or any other type of load.

Motor 106 is provided with power from DC power source 116. For example, without limitation, DC power source 116 on aircraft 104 may be a DC bus that is provided with DC power from an AC to DC power converter. Power for the AC to DC power converter may be provided from AC power on an AC bus. AC power on the AC bus may be provided by a generator on aircraft 104. In other applications, DC power source 116 may be another type of DC power source, such as a battery.

DC power source 116 is coupled to windings 110 of motor 106 via H-bridge 118. H-bridge 118 comprises a plurality of switches that may be opened and closed to connect DC power source 116 to windings 110 in a variety of configurations. The plurality of switches in H-bridge 118 may be controlled to continually switch the phase of the power provided on windings 110 to keep motor 106 running.

Motor controller 120 may control the switching of H-bridge 118 to drive motor 106. Motor controller 120 may employ conventional feedback techniques to control motor 106 to drive load 114 at a desired speed.

Motor controller 120 may be implemented using hardware or hardware in combination with software. For example, motor controller 120 may be implemented using configurable hardware 121. Configurable hardware 121 is hardware that is configurable to perform one or more functions of motor controller 120.

As another example, motor controller 120 may be implemented using programmable device 122. Programmable device 122 may be any device that is programmable to implement one or more functions of motor controller 120. For example, without limitation, programmable device 122 may be a programmable microcontroller, digital signal processor, or other programmable device.

Programmable device 122 may be programmed by software or firmware in the form of program instructions 124. Program instructions 124 may be stored in computer readable storage medium 126 for use by or transfer to programmable device 122. Program instructions 124 stored on computer readable storage medium 126 may form computer program product 128.

In accordance with an illustrative embodiment, motor controller 120 controls the switches in H-bridge 118 to close one of the switches in H-bridge 118 to put H-bridge 118 in a coast configuration wherein selected windings 110 in motor 106 are short circuited. Motor controller 120 may include coast switch selector function 130 to select the switch that is closed to put H-bridge 118 in the coast configuration. Preferably, coast switch selector function 130 selects the switch to close to put H-bridge 118 in the coast configuration based on currents in windings 110 immediately before closing the switch.

Motor controller 120 may employ impulse direction identifier function 132 to identify the direction of the current impulse that is to be provided to windings 110 in a particular duty cycle. Based on the desired direction of the current impulse, motor controller 120 either opens the switch that is currently closed or opens another of the switches in H-bridge 118 to provide the current impulse in the desired direction to windings 110.

Motor controller 120 may include switch command generator function 134 for generating the appropriate control signals for opening and closing the switches in H-bridge 118 in a desired manner. Appropriate circuitry is provided between motor controller 120 and H-bridge 118 to allow motor controller 120 to open and close the switches in H-bridge 118.

The illustration of FIG. 1 is not meant to imply physical or architectural limitations to the manner in which different illustrative embodiments may be implemented. Other components in addition to, in place of, or both in addition to and in place of the ones illustrated may be used. Some components may be unnecessary in some illustrative embodiments. Also, the blocks are presented to illustrate some functional components. One or more of these blocks may be combined or divided into different blocks when implemented in different illustrative embodiments.

For example, motor 106 may be connected to drive more than one load. Motor controller 120 may receive input from one or more higher level controllers for controlling motor 106 or load 114. For example, motor controller 120 may receive commands to start motor 106, stop motor 106, or to operate motor 106 or load 114 at a desired speed. Motor controller 120 may control the switches in H-bridge 118 in response to these commands to operate motor 106 in the requested manner. In one example, without limitation, the higher level controller may be an entirely automated controller, a human operator, or a human operator in combination with a machine controller.

Illustrative embodiments may be used to control motors of any size for use in any application or operating environment. For example, without limitation, illustrative embodiments may be used to control motors used on automobiles, airplanes, boats, spacecraft, and other vehicles. For example, illustrative embodiments may be used to control motors for antennas pointing on spacecraft, for heating ventilation and air conditioning (HVAC) systems, for boring devices for riveting on aircraft wings and fuselages, and for other applications.

Figure 2:
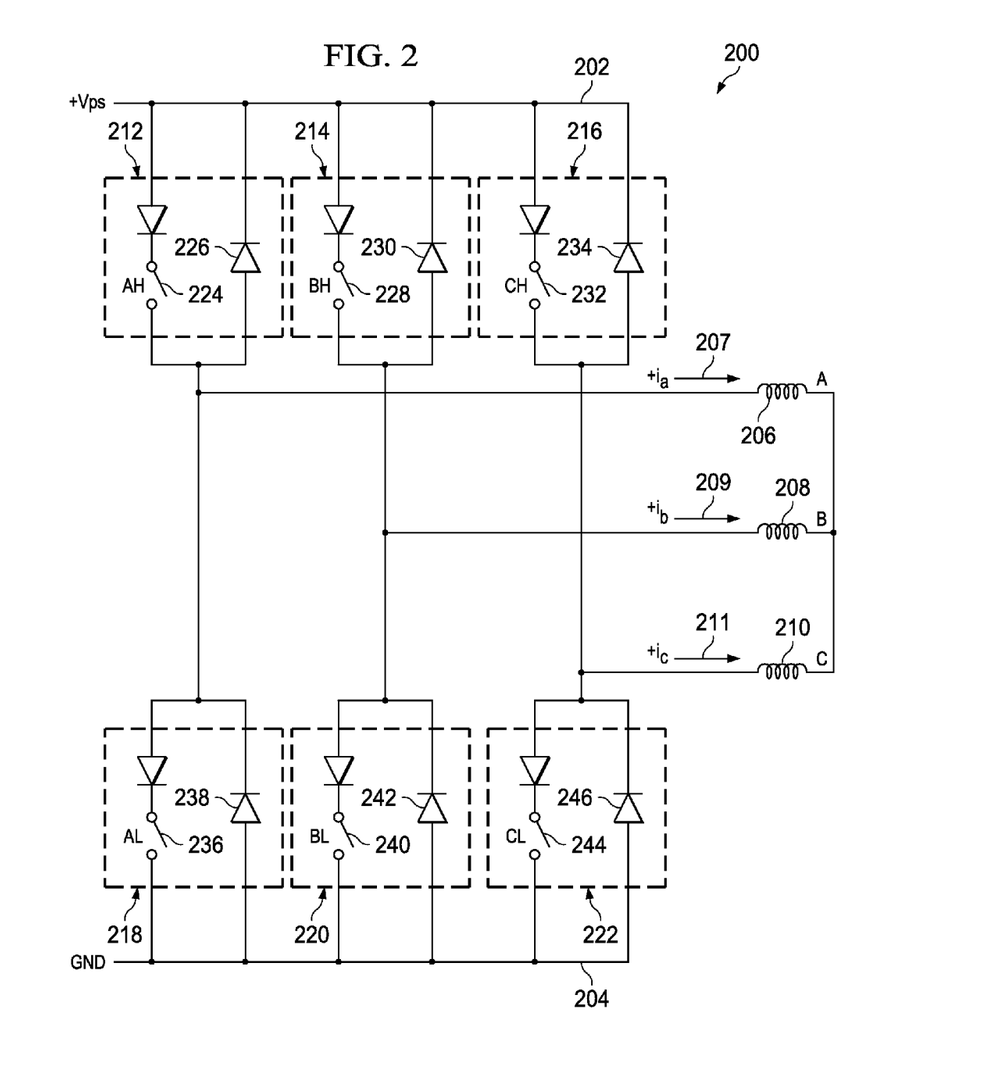
FIG. 2 is an illustration of a schematic circuit diagram of an H-bridge for controlling current in a motor in accordance with an illustrative embodiment.

Turning to FIG. 2, an illustration of a schematic circuit diagram of an H-bridge for controlling current in a motor is depicted in accordance with an illustrative embodiment. In this example, H-bridge 200 is an example of one implementation of H-bridge 118 in FIG. 1.

H-bridge 200 is configured to couple DC power to windings 206, 208, and 210 of a motor. In this example, H-bridge 200 is connected to line 202 and ground 204.

In this example, the motor connected to H-bridge 200 is a three-phase motor comprising windings 206 for phase A, windings 208 for phase B, and windings 210 for phase C. For purposes of the present explanation, current in windings 206, 208, and 210 in the direction indicated by arrows 207, 209, and 211, respectively, may be referred to as current in a positive direction. Current in the direction opposite to arrows 207, 209, and 211 may be referred to as current in a negative direction.

Three-phase H-bridge 200 comprises six switching units 212, 214, 216, 218, 220, and 222. Switching units 212, 214, 216, 218, 220, and 222 may be implemented using solid state circuit elements. For example, without limitation, switching units 212, 214, 216, 218, 220, and 222 may be implemented using metal-oxide-semiconductor field-effect transistors (MOSFETs), insulated-gate bipolar transistors (IGBTs), or other transistors or combinations of transistors.

Switching unit 212 is connected between line 202 and windings 206 for phase A. Switching unit 212 comprises switch 224 and diode 226. Switch 224 conducts current in the direction from line 202 to windings 206 when closed. Diode 226 is parallel with switch 224 and conducts current in the opposite direction of switch 224.

Switching unit 214 is connected between line 202 and windings 208 for phase B. Switching unit 214 comprises switch 228 and diode 230. Switch 228 conducts current in the direction from line 202 to windings 208 when closed. Diode 230 is parallel with switch 228 and conducts current in the opposite direction of switch 228.

Switching unit 216 is connected between line 202 and windings 210 for phase C. Switching unit 216 comprises switch 232 and diode 234. Switch 232 conducts current in the direction from line 202 to windings 210 when closed. Diode 234 is parallel with switch 232 and conducts current in the opposite direction of switch 232.

Switching unit 218 is connected between windings 206 for phase A and ground 204. Switching unit 218 comprises switch 236 and diode 238. Switch 236 conducts current in the direction from windings 206 to ground 204 when closed. Diode 238 is parallel with switch 236 and conducts current in the opposite direction of switch 236.

Switching unit 220 is connected between windings 208 for phase B and ground 204. Switching unit 220 comprises switch 240 and diode 242. Switch 240 conducts current in the direction from windings 208 to ground 204 when closed. Diode 242 is parallel with switch 240 and conducts current in the opposite direction of switch 240.

Switching unit 222 is connected between windings 210 for phase C and ground 204. Switching unit 222 comprises switch 244 and diode 246. Switch 244 conducts current in the direction from windings 210 to ground 204 when closed. Diode 246 is parallel with switch 244 and conducts current in the opposite direction of switch 244.

In accordance with an illustrative embodiment, the switches in H-bridge 200 may be controlled using impulse width modulation to provide four quadrant current control in windings 206, 208, and 210. Four quadrant current control means that, for an existing current in either positive or negative direction in one of windings 206, 208, or 210, a current impulse may be provided to either boost or buck that existing current. For example, with a current in the positive direction of arrow 207 in winding 206, the switches in H-bridge 200 may be controlled to provide a push impulse in the positive direction of arrow 207 (quadrant 1) or a push impulse in the negative direction opposite to arrow 207 (quadrant 2). With a current in the negative direction in winding 206, the switches in H-bridge 200 may be controlled to provide a push impulse in the negative direction (quadrant 3) or a push impulse in the positive direction of arrow 207 (quadrant 4). Quadrants 1, 2, 3, and 4 referred to above are not shown in this illustrative example.

H-bridge 200 is an example generic H-bridge structure that is provided to more clearly describe general operation of various illustrative embodiments. The illustration of FIG. 2 is not meant to imply physical or architectural limitations to the manner in which an H-bridge in accordance with different illustrative embodiments may be implemented. An H-bridge in accordance with different illustrative embodiments may be implemented with different combinations of parts from those illustrated for example in FIG. 2.

For example, for an H-bridge implemented using IGBTs, the diodes shown in FIG. 2 may need to be provided as separated devices, because IGBTs do not have body diodes. For an H-bridge implemented using MOSFETs, the internal body diodes of the MOSFETs may be used. With MOSFETs used for switches, separated freewheeling diodes are not necessary. Separate diodes in series with the MOSFET switches also are not necessary, but may be used in some applications.

Figure 3:
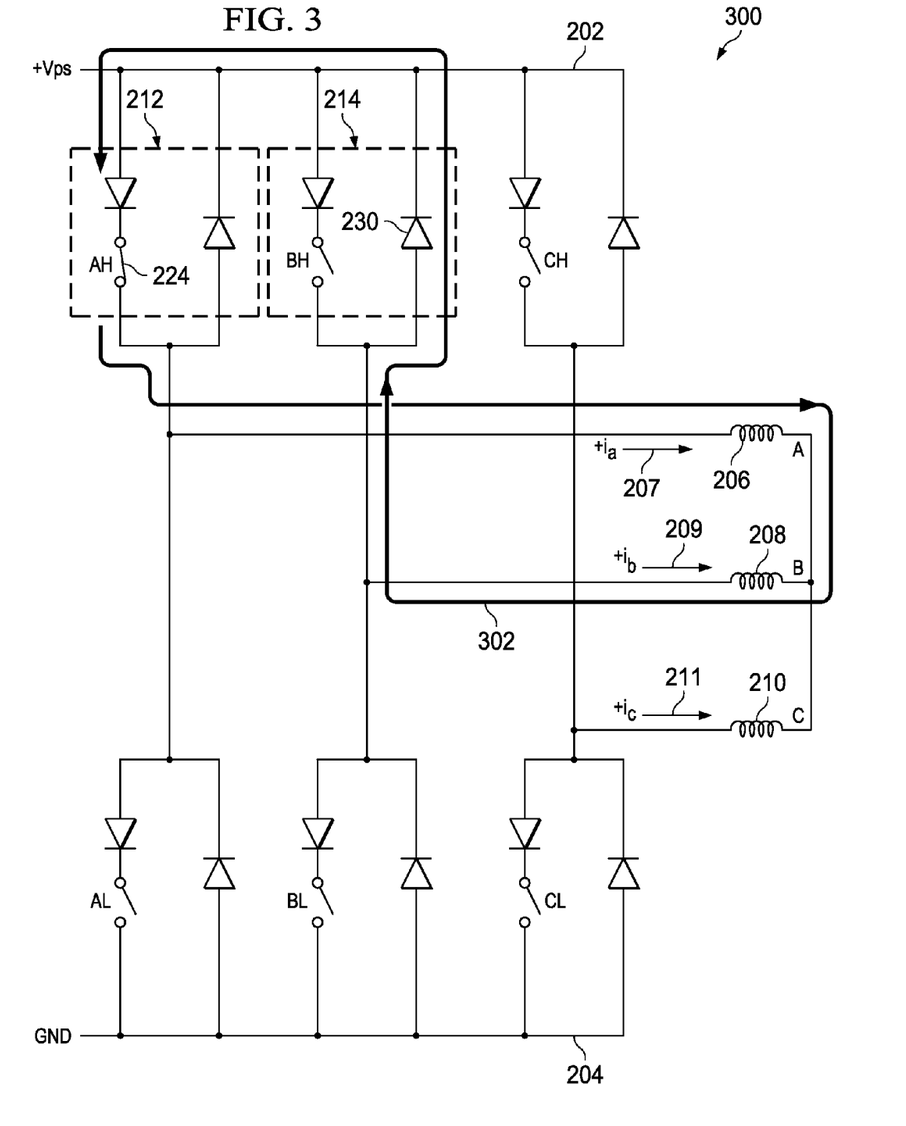
FIG. 3 is an illustration of a schematic circuit diagram of an H-bridge for controlling current in a motor in a coast configuration in accordance with an illustrative embodiment.
Figure 4:
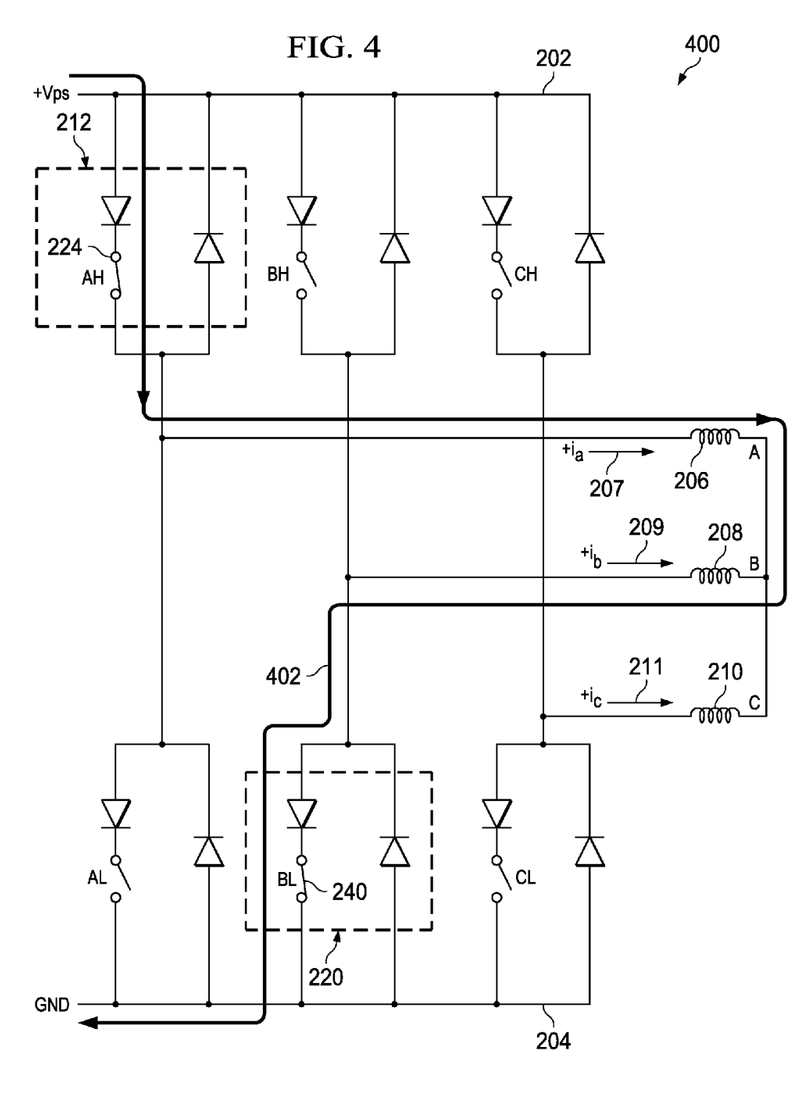
FIG. 4 is an illustration of a schematic circuit diagram of an H-bridge for controlling current in a motor in a first current impulse configuration in accordance with an illustrative embodiment.
Figure 5:
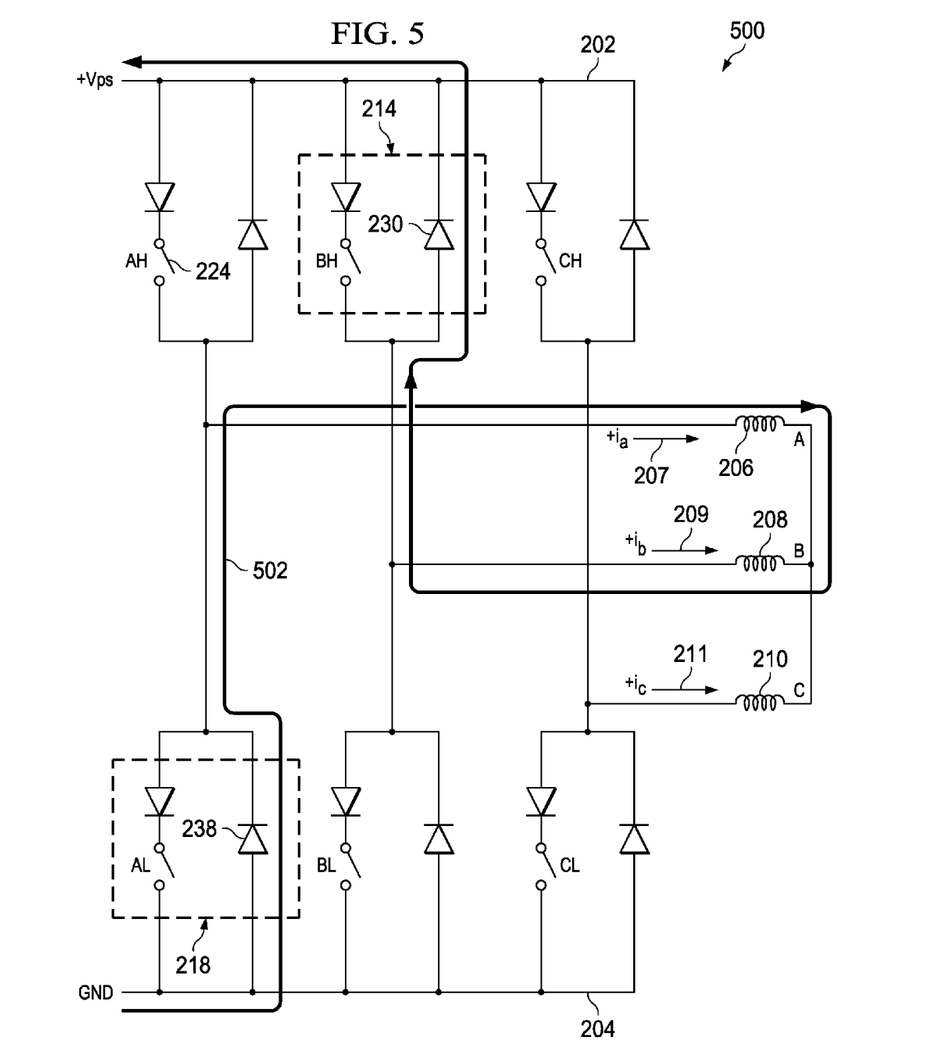
FIG. 5 is an illustration of a schematic circuit diagram of an H-bridge for controlling current in a motor in a second current impulse configuration in accordance with an illustrative embodiment.

In accordance with an illustrative embodiment, the switches in H-bridge 200 are controlled to either turn on only a single switch or turn off only a single switch each duty cycle. An example of this switching process is described with reference to FIGS. 3-5. FIGS. 3-5 show H-bridge 200 of FIG. 2 in various states of operation.

Turning to FIG. 3, an illustration of a schematic circuit diagram of an H-bridge for controlling current in a motor in a coast configuration is depicted in accordance with an illustrative embodiment. In this example, H-bridge 300 is an example configuration of H-bridge 200 in FIG. 2.

H-bridge 300 is shown in a coast configuration at the beginning of a duty cycle. In this example, switch 224 is closed to configure H-bridge 300 in the coast configuration. This results in current 302 in H-bridge 300. Current 302 runs through switch 224, in the positive direction of arrow 207 through windings 206 for phase A, in the negative direction opposite to arrow 209 through windings 208 for phase B, and through diode 230 in switching unit 214.

From the coast configuration in FIG. 3, a motor controller may determine either that the current in the positive direction of arrow 207 in winding 206 should be increased or that the current in the positive direction of arrow 207 in winding 206 should be decreased. In accordance with an illustrative embodiment, H-bridge 300 is changed to the configuration of H-bridge 400 in FIG. 4 in response to an indication from the motor controller that the current in the positive direction of arrow 207 in winding 206 is to be increased. In accordance with an illustrative embodiment, H-bridge 300 is changed to the configuration of H-bridge 500 in FIG. 5 in response to an indication from the motor controller that the current in the positive direction of arrow 207 in winding 206 is to be decreased.

Turning to FIG. 4, an illustration of a schematic circuit diagram of an H-bridge for controlling current in a motor in a first current impulse configuration is depicted in accordance with an illustrative embodiment. In this example, H-bridge 400 is an example configuration of H-bridge 200 in FIG. 2.

In this example, the configuration of H-bridge 400 in FIG. 4 is accomplished by closing switch 240 in response to an indication from a motor controller that the current in the positive direction of arrow 207 in winding 206 in the coast configuration of H-bridge 300 in FIG. 3 is to be increased. Closing switch 240 results in current 402. Current 402 runs from line 202 through switch 224, in the positive direction of arrow 207 through windings 206 for phase A, in the negative direction opposite to arrow 209 through windings 208 for phase B, and through switch 240 to ground 204.

Turning to FIG. 5, an illustration of a schematic circuit diagram of an H-bridge for controlling current in a motor in a second current impulse configuration is depicted in accordance with an illustrative embodiment. In this example, H-bridge 500 is an example configuration of H-bridge 200 in FIG. 2.

In this example, the configuration of H-bridge 500 in FIG. 5 is accomplished by opening switch 224 in response to an indication from a motor controller that the current in the positive direction of arrow 207 in winding 206 in the coast configuration of H-bridge 300 in FIG. 3 is to be decreased. Opening switch 224 results in current 502. Current 502 runs in the direction from ground 204 through diode 238, in the positive direction of arrow 207 through windings 206 for phase A, in the negative direction opposite to arrow 209 through windings 208 for phase B, and through diode 230 to line 202.

The example shown in FIGS. 3-5 is one example of switching to control motor current in accordance with an illustrative embodiment. The example shown in FIGS. 3-5 illustrates switching to control motor current wherein the H-bridge starts the cycle in one particular coast configuration in accordance with an illustrative embodiment. Different switching actions from those described with reference to FIGS. 3-5 will be used when the H-bridge is in a different coast configuration. The specific switching actions to be performed for any particular H-bridge configuration to provide a current impulse in a desired direction to the motor windings will be known to those skilled in the art based on the detailed description and examples of illustrative embodiments as presented herein.

Figure 6:
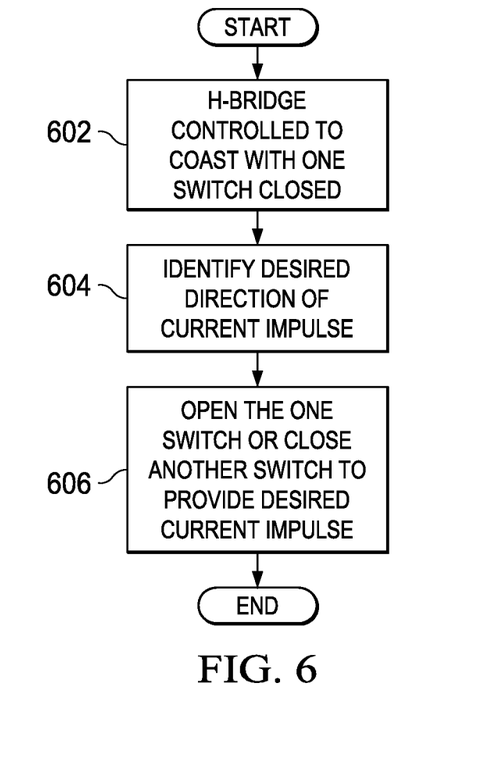
FIG. 6 is an illustration of a flowchart of a process for controlling current in a brushless DC motor in accordance with an illustrative embodiment.

Turning to FIG. 6, an illustration of a flowchart of a process for controlling current in a brushless DC motor is depicted in accordance with an illustrative embodiment. In this example, the process of FIG. 6 may be implemented in motor controller 120 in FIG. 1.

The process begins with an H-bridge that is controlled to coast with one switch of the H-bridge closed (operation 602). The desired direction of a current impulse to the motor windings is identified (operation 604). The one switch of the H-bridge that is currently closed is opened or another switch in the H-bridge is closed to provide the desired current pulse to the motor windings (operation 606), with the process terminating thereafter.

The process of FIG. 6 illustrates the process that is followed in a single duty cycle. Thus, a single switch is opened or closed to provide the desired current impulse to the motor windings for a duty cycle.

Figure 7:
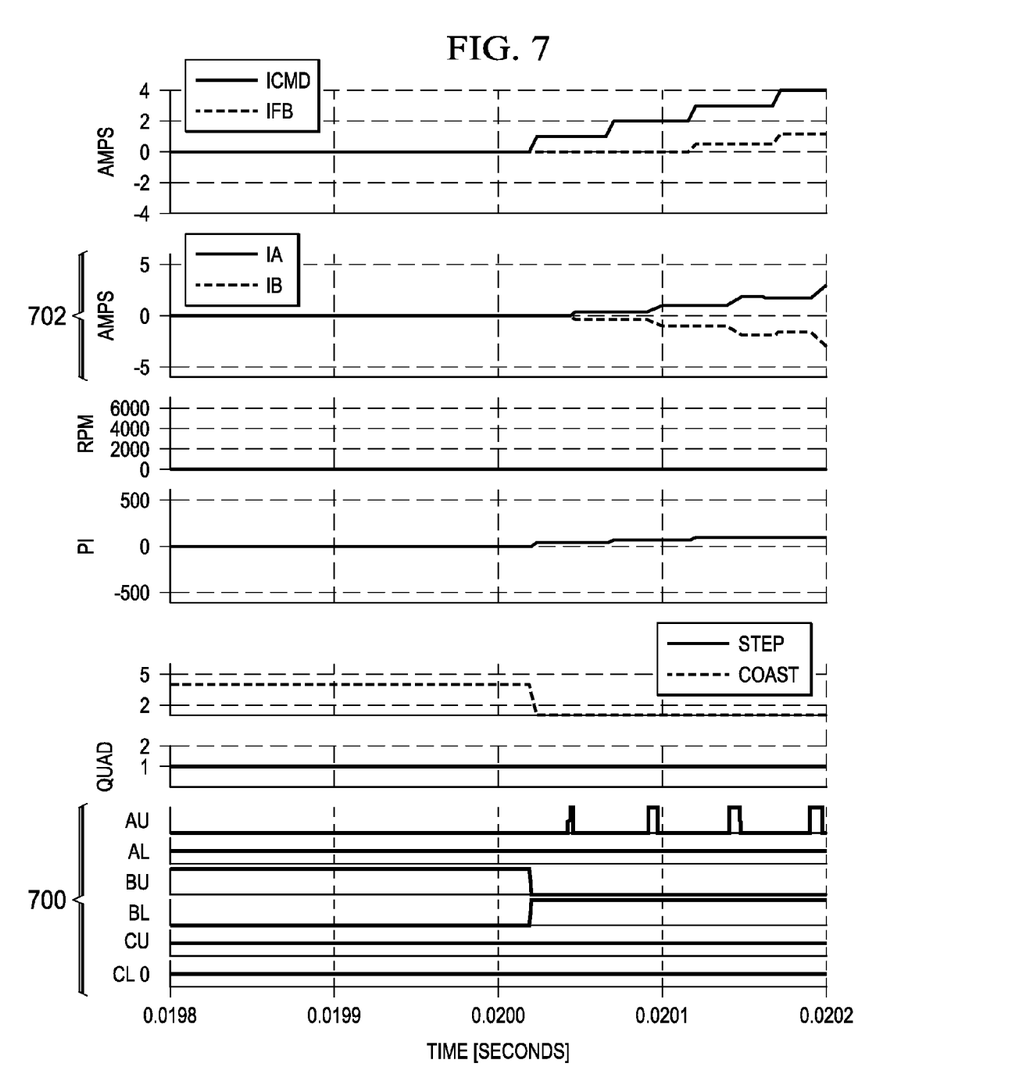
FIG. 7 is an illustration of a waveform diagram of various signals in a motor controller, H-bridge, and motor in accordance with an illustrative embodiment.
Figure 8:
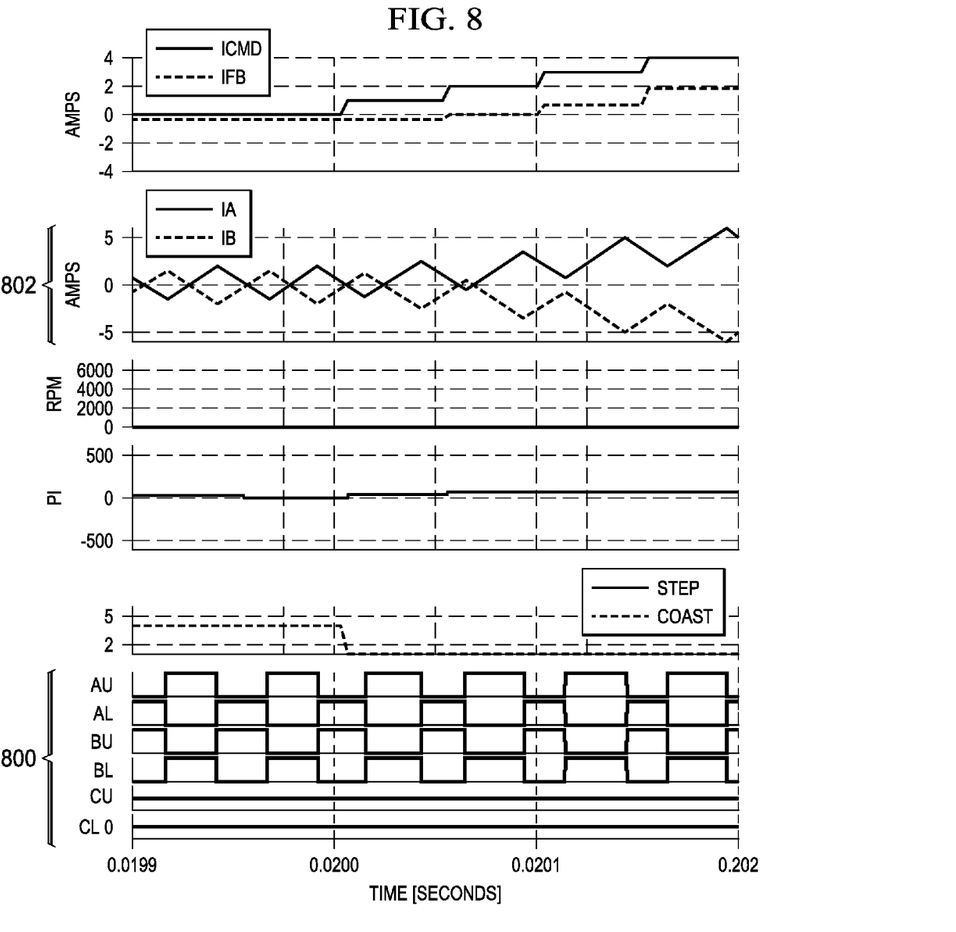
FIG. 8 is an illustration of a waveform diagram of various signals in a motor controller, H-bridge, and motor that is controlled using conventional pulse width modulation.

Turning now to FIG. 7, an illustration of a waveform diagram of various signals in a motor controller, H-bridge, and motor is depicted in accordance with an illustrative embodiment. FIG. 7 illustrates various waveforms resulting from current control in the motor using impulse width modulation in accordance with an illustrative embodiment. In contrast, turning to FIG. 8, an illustration of a waveform diagram of various signals in a motor controller, H-bridge, and motor that is controlled using conventional pulse width modulation is depicted. The waveforms in FIG. 7 and FIG. 8 illustrate various signals that result from operation of similar motors, to perform similar functions, but using different switching schemes for controlling current in the windings of the motor.

Waveforms 700 in FIG. 7 show switching signals for controlling a motor using impulse width modulation in accordance with an illustrative embodiment. Waveforms 800 in FIG. 8 show switching signals for controlling a motor using conventional pulse width modulation. Comparison of waveforms 700 with waveforms 800 shows that motor control in accordance with an illustrative embodiment results in significantly fewer switching operations as compared to motor control using conventional pulse width modulation.

Waveforms 702 in FIG. 7 show currents in the motor windings of a motor controlled using impulse width modulation in accordance with an illustrative embodiment. Waveforms 702 show no current ripples, or almost no current ripples, in the motor windings. Waveforms 802 show currents in the motor windings of a motor controlled using conventional pulse width modulation. Waveforms 802 show very noticeable current ripples in the motor windings. Comparison of waveforms 702 with waveforms 802 shows that motor control in accordance with an illustrative embodiment reduces current ripples in the motor windings.

Figure 9:
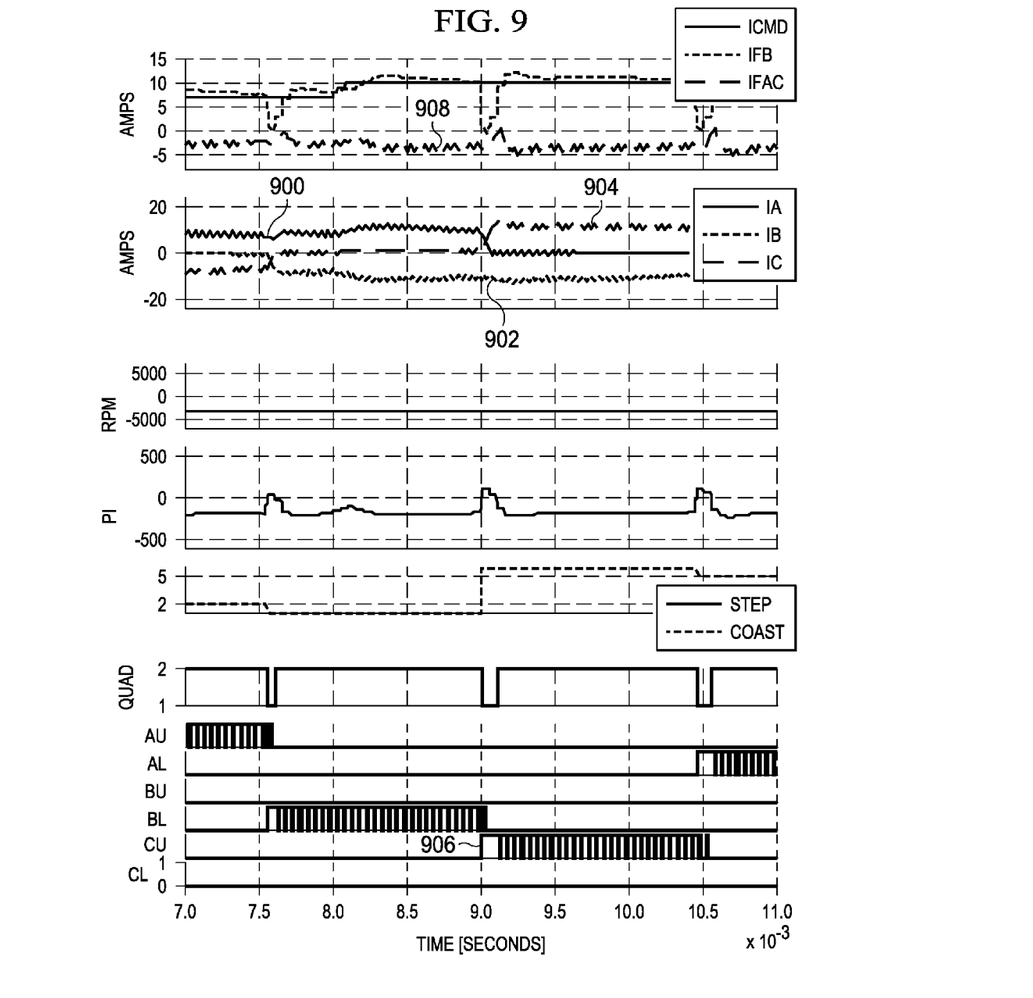
FIG. 9 is an illustration of a waveform diagram of various signals in a motor controller, H-bridge, and motor wherein a switch for an inactive winding of the motor is selected to put the H-bridge in a coast configuration in accordance with an illustrative embodiment.

Turning now to FIG. 9, an illustration of a waveform diagram of various signals in a motor controller, H-bridge, and motor wherein a switch for an inactive winding of the motor is selected to put the H-bridge in a coast configuration is depicted in accordance with an illustrative embodiment. In this example, waveform 900 shows the current in winding A of the motor, waveform 902 show the current in winding B of the motor, and waveform 904 shows the current in winding C of the motor.

As used in the present application, including in the claims, an "inactive" winding refers to the winding in a three-phase motor which, during operation of the motor, is carrying less current than either of the other two windings of the motor. As used in the present application, including in the claims, an "active" winding refers to any winding in the motor which, during operation of the motor, is carrying more current than the inactive winding.

In this example, commutation of the motor windings occurs at time $9 \times 10^{-3}$ seconds. Prior to commutation, current flows in winding A and winding B. After commutation, current flows in windings B and C. At commutation, one of the switching devices in the H-bridge is closed to put the H-bridge in a coast configuration, as shown by switching signal 906. In this example, the switch that is selected to be closed is a switch for winding C. At the time that the switch is closed, winding C is the inactive winding.

One consequence of selecting a switch for an inactive winding for the coast configuration is that the switch may need to be closed initially for almost an entire duty cycle, as shown by switching signal 906. Furthermore, selecting a switch for a dry winding for the coast configuration may result in current ripples, as shown in waveform 908.

Figure 10:
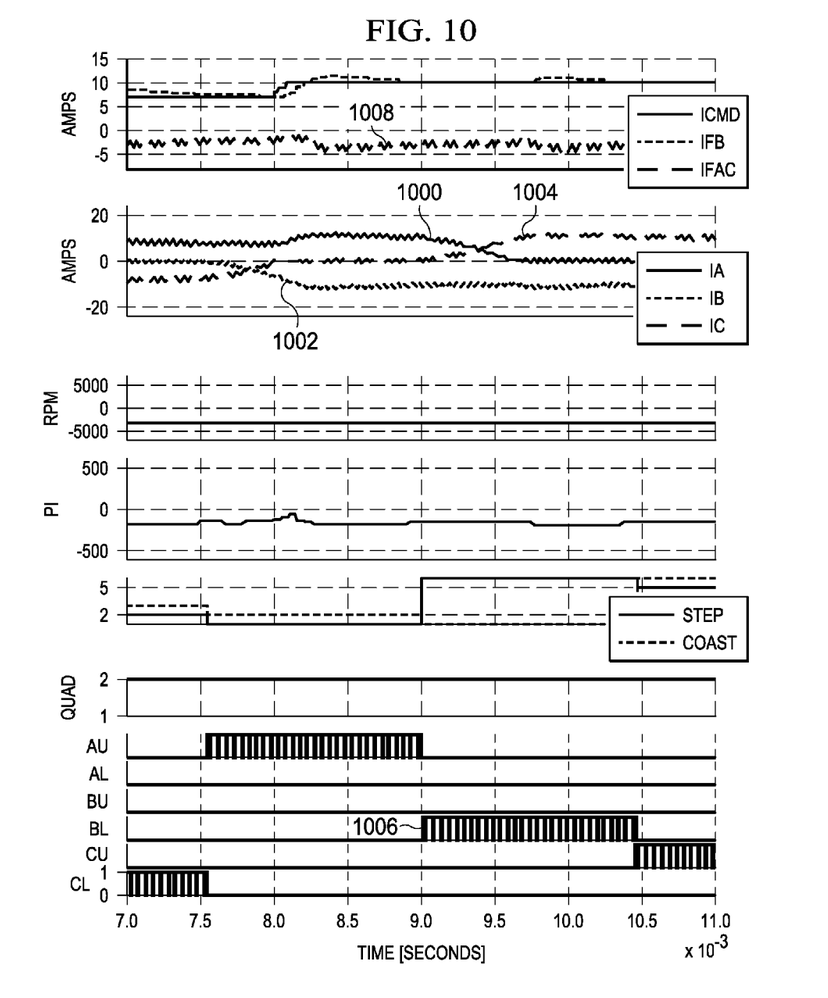
FIG. 10 is an illustration of a waveform diagram of various signals in a motor controller, H-bridge, and motor wherein a switch for an active winding of the motor is selected to put the H-bridge in a coast configuration in accordance with an illustrative embodiment.

Turning now to FIG. 10, an illustration of a waveform diagram of various signals in a motor controller, H-bridge, and motor wherein a switch for an active winding of the motor is selected to put the H-bridge in a coast configuration is depicted in accordance with an illustrative embodiment. In this example, waveform 1000 shows the current in winding A of the motor, waveform 1002 show the current in winding B of the motor, and waveform 1004 shows the current in winding C of the motor.

In this example, commutation of the motor windings occurs at time $9 \times 10^{-3}$ seconds. Prior to commutation, current flows in winding A and winding B. After commutation, current flows in windings B and C. At commutation, one of the switching devices in the H-bridge is closed to put the H-bridge in a coast configuration. In this example, the switch that is selected to be closed is a switch for winding B, as shown by switching signal 1006. At the time that the switch is closed, winding B is an active winding conducting current.

By selecting a switch for an active winding for the coast configuration, the switch may be closed for a smaller portion of the duty cycle than if a switch for an inactive winding was selected for the coast configuration. This is demonstrated in the current examples by comparing switching signal 906 in FIG. 9 with switching signal 1006 in FIG. 10. Additionally, selecting a switch for an active winding for the coast configuration may reduce current ripples as compared to the case where a switch for an inactive winding is selected for the coast configuration. This is demonstrated in the current examples by comparing waveform 908 in FIG. 9 with waveform 1008 in FIG. 10. Therefore, it is preferable to select a switch for an active current carrying winding as the switch that is closed to provide the coast configuration.

One or more of the illustrative embodiments provide four quadrant control of current within the windings of a brushless DC motor with an H-bridge switching configuration. Illustrative embodiments reduce the number of switch state transitions from four to one per duty cycle, as compared to conventional motor control using pulse width modulation.

Impulse width modulation, in accordance with an illustrative embodiment, provides four quadrant current control with only one switch turning on or off per duty cycle. The ripple currents associated with pulse width modulation motor control are eliminated during quiescent operations. The ripple currents during high power application are reduced by a factor of four relative to pulse width modulation. The heat losses in the H-bridge switches and diodes, controller, power supply, and harnesses are greatly reduced. The eddy current thermal build-up in the motor laminates resulting from pulse width modulation control methods is eliminated.

Impulse width modulation, in accordance with an illustrative embodiment, provides a method of linear control via the switches in the H-bridge. Linear control improves the smoothness and thus reduces the jerking or electromechanical systems powered by brushless DC motors.

The different illustrative embodiments can take the form of an entirely hardware embodiment, an entirely software embodiment, or an embodiment containing both hardware and software elements. Some embodiments are implemented in software, which includes, but is not limited to, forms such as, for example, without limitation, firmware, resident software, and microcode.

Furthermore, the different embodiments can take the form of a computer program product accessible from a computer usable or computer readable medium providing program code for use by or in connection with a computer or any device or system that executes instructions. For the purposes of this disclosure, a computer usable or computer-readable medium can generally be any tangible apparatus that can contain, store, communicate, propagate, or transport the program for use by or in connection with the instruction execution system, apparatus, or device.

The computer usable or computer readable medium can be, for example, without limitation, an electronic, magnetic, optical, electromagnetic, infrared, or semiconductor system, or a propagation medium. Non-limiting examples of a computer readable medium include a semiconductor or solid state memory, magnetic tape, a removable computer diskette, a random access memory (RAM), a read-only memory (ROM), a rigid magnetic disk, and an optical disk. Optical disks may include compact disk-read only memory (CD-ROM), compact disk-read/write (CD-R/W), and DVD.

Further, a computer usable or computer readable medium may contain or store a computer readable or computer usable program code such that when the computer readable or computer usable program code is executed on a computer, the execution of this computer readable or computer usable program code causes the computer to transmit another computer readable or computer usable program code over a communications link. This communications link may use a medium that is, for example, without limitation, physical or wireless.

A data processing system suitable for storing and/or executing computer readable or computer usable program code will include one or more processors coupled directly or indirectly to memory elements through a communications fabric, such as a system bus. The memory elements may include local memory employed during actual execution of the program code, bulk storage, and cache memories which provide temporary storage of at least some computer readable or computer usable program code to reduce the number of times code may be retrieved from bulk storage during execution of the code.

Input/output, or I/O, devices can be coupled to the system either directly or through intervening I/O controllers. These devices may include, for example, without limitation, keyboards, touch screen displays, and pointing devices. Different communications adapters may also be coupled to the system to enable the data processing system to become coupled to other data processing systems or remote printers or storage devices through intervening private or public networks. Non-limiting examples such as modems and network adapters are just a few of the currently available types of communications adapters.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus comprising:
an H-bridge configured to couple a direct current power source to windings of a motor, wherein the H-bridge comprises a plurality of switches; and
a motor controller configured to:
close one of the plurality of switches to put the H-bridge in a coast configuration, wherein the windings are short circuited,
identify a desired direction for a current impulse to the windings, wherein identifying the desired direction comprises indicating to increase or decrease a magnitude of a current in the windings while maintaining a positive direction of the current,
open the one of the plurality of switches in response to identifying a first desired direction for the current impulse to provide the current impulse in the first desired direction to the windings, and close another of the plurality of switches in response to identifying a second desired direction for the current impulse to provide the current impulse in the second desired direction to the windings, wherein:

the close of one of the plurality of switches, the open of the one of the plurality of switches, and the close of another of the plurality of switches are configured to reduce ripple currents relative to the ripple currents that would be present with pulse width modulation, and the current impulse increases or decreases the magnitude of the current in the windings once per a duty cycle while maintaining the positive direction of the current.

2. The apparatus of claim 1, wherein the motor controller is configured to select the one of the plurality of switches based on currents in the windings immediately before closing the one of the plurality of switches.

3. The apparatus of claim 2, wherein the one of the plurality of switches is a switch for one of the windings that is carrying more current than another winding of the motor immediately before closing the one of the plurality of switches.

4. The apparatus of claim 2, wherein the motor controller is configured to select the one of the plurality of switches based on directions of currents in the windings immediately before closing the one of the plurality of switches and desired directions of currents in the windings immediately after closing the one of the plurality of switches.

5. The apparatus of claim 1, wherein the plurality of switches comprise switching devices configured to conduct in third directions when the switching devices are closed and diodes parallel with the switching devices and configured to conduct in fourth directions opposite to the third directions.

6. The apparatus of claim 1, wherein the plurality of switches are selected from a group of switching devices consisting of metal-oxide-semiconductor field-effect transistors and insulated-gate bipolar transistors.

7. The apparatus of claim 1, wherein the H-bridge and the motor controller are on an aircraft.

8. A method for controlling a brushless direct current motor, the method comprising:

closing one of a plurality of switches in an H-bridge to put the H-bridge in a coast configuration, wherein windings of the brushless direct current motor are short circuited and wherein the H-bridge is configured to couple a direct current power source to the windings;

identifying a desired direction for a current impulse to the windings, wherein identifying the desired direction comprises indicating to increase or decrease a magnitude of a current in the windings while maintaining a positive direction of the current;

opening the one of the plurality of switches in response to identifying a first desired direction for the current impulse to provide the current impulse in the first desired direction to the windings; and closing another of the plurality of switches in response to identifying a second desired direction for the current impulse to provide the current impulse in the second desired direction to the windings, wherein:

the close of one of the plurality of switches, the open of the one of the plurality of switches, and the close of another of the plurality of switches are configured to reduce ripple currents relative to the ripple currents that would be present with pulse width modulation, and the current impulse increases or decreases the magnitude of the current in the windings once per a duty cycle while maintaining the positive direction of the current.

9. The method of claim 8 further comprising selecting the one of the plurality of switches based on currents in the windings immediately before closing the one of the plurality of switches.

10. The method of claim 9, wherein the one of the plurality of switches is a switch for one of the windings that is carrying more current than another winding of the brushless direct current motor immediately before closing the one of the plurality of switches.

11. The method of claim 9 further comprising selecting the one of the plurality of switches based on directions of currents in the windings immediately before closing the one of the plurality of switches and desired directions of currents in the windings immediately after closing the one of the plurality of switches.

12. The method of claim 8, wherein the plurality of switches comprise switching devices configured to conduct in third directions when the switching devices are closed and diodes parallel with the switching devices and configured to conduct in fourth directions opposite to the third directions.

13. The method of claim 8, wherein the plurality of switches are selected from a group of switching devices consisting of metal-oxide-semiconductor field-effect transistors and insulated-gate bipolar transistors.

14. The method of claim 8, wherein the brushless direct current motor is on an aircraft.

15. A computer program product for controlling a brushless direct current motor, the computer program product comprising:

a non-transitory computer readable storage medium;

first program instructions for closing one of a plurality of switches in an H-bridge to put the H-bridge in a coast configuration, wherein windings of the brushless direct current motor are short circuited and wherein the H-bridge is configured to couple a direct current power source to the windings;

second program instructions for identifying a desired direction for a current impulse to the windings, wherein identifying the desired direction comprises indicating to increase or decrease a magnitude of a current in the windings while maintaining a positive direction of the current;

third program instructions for opening the one of the plurality of switches in response to identifying a first desired direction for the current impulse to provide the current impulse in the first desired direction to the windings; and fourth program instructions for closing another of the plurality of switches in response to identifying a second desired direction for the current impulse to provide the current impulse in the second desired direction to the windings;

wherein:

the first program instructions, the second program instructions, the third program instructions, and the fourth program instructions are stored on the non-transitory computer readable storage medium, the close of one of the plurality of switches, the open of the one of the plurality of switches, and the close of another of the plurality of switches are configured to reduce ripple currents relative to the ripple currents that would be present with pulse width modulation, and the current impulse increases or decreases the magnitude of the current in the windings once per a duty cycle while maintaining the positive direction of the current.

16. The computer program product of claim 15 further comprising fifth program instructions for selecting the one of the plurality of switches based on currents in the windings immediately before closing the one of the plurality of switches, wherein the fifth program instructions are stored on the non-transitory computer readable storage medium.

17. The computer program product of claim 16, wherein the one of the plurality of switches is a switch for a selected one of the windings that is carrying more current than another winding of the motor immediately before closing the one of the plurality of switches.

18. The computer program product of claim 16, wherein the fifth program instructions comprise program instructions for selecting the one of the plurality of switches based on directions of currents in the windings immediately before closing the one of the plurality of switches and desired directions of currents in the windings immediately after closing the one of the plurality of switches.

19. The computer program product of claim 15, wherein the plurality of switches comprise switching devices configured to conduct in third directions when the switching devices are closed and diodes parallel with the switching devices and configured to conduct in fourth directions opposite to the third directions.

20. The computer program product of claim 15, wherein the plurality of switches are selected from a group of switching devices consisting of metal-oxide-semiconductor field-effect transistors and insulated-gate bipolar transistors.

* * * * *